FRANCIS A. RAMEY & R. R. CROSS.
Improvement in Corn Planters.

Plate I.     2 Plates

No. 119,950.     Patented Oct. 17, 1871.

Witnesses:

Inventor
F. A. Ramey
R. R. Cross

FRANCIS A. RAMEY & R. R. CROSS.
Improvement in Corn Planters.

No. 119,950. Patented Oct. 17, 1871.

UNITED STATES PATENT OFFICE.

FRANCIS A. RAMEY AND RANSLER R. CROSS, OF WOODSTOCK, VIRGINIA.

IMPROVEMENT IN CORN-PLANTERS.

Specification forming part of Letters Patent No. 119,950, dated October 17, 1871.

*To all whom it may concern:*

Be it known that we, FRANCIS A. RAMEY and RANSLER R. CROSS, of Woodstock, in the county of Shenandoah and State of Virginia, have invented certain new and useful Improvements in Planters; and we do hereby declare that the following is a full, clear, and exact description thereof, reference being had to the accompanying drawing making part of this specification, in which—

Figure 1:
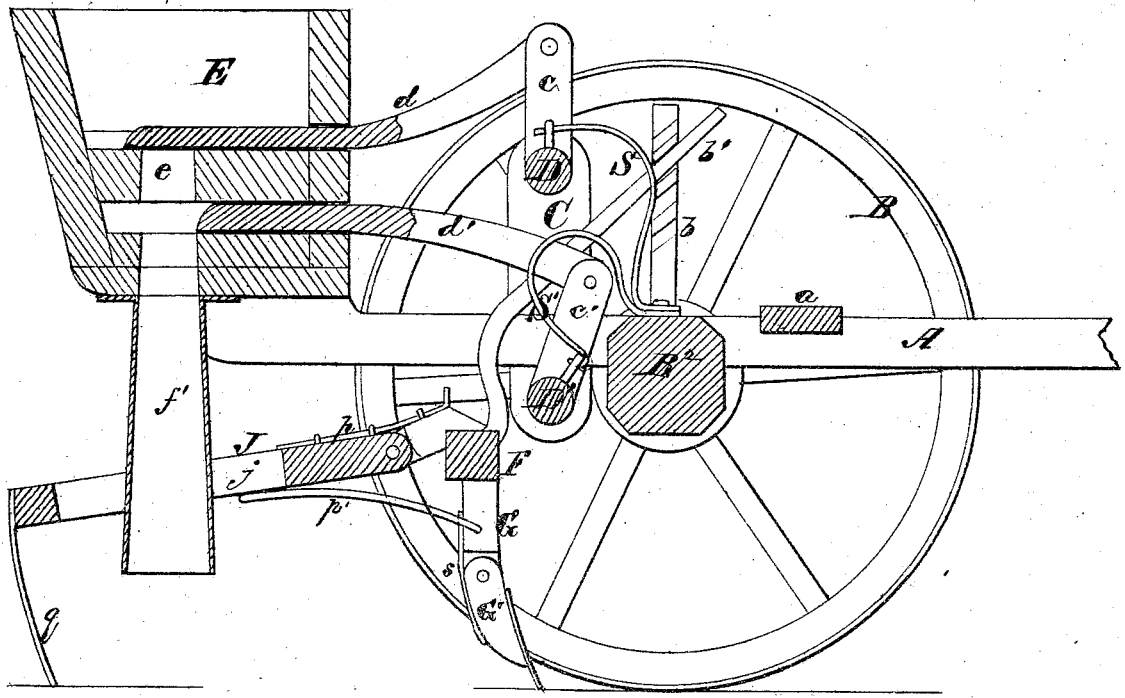
Figure 2:
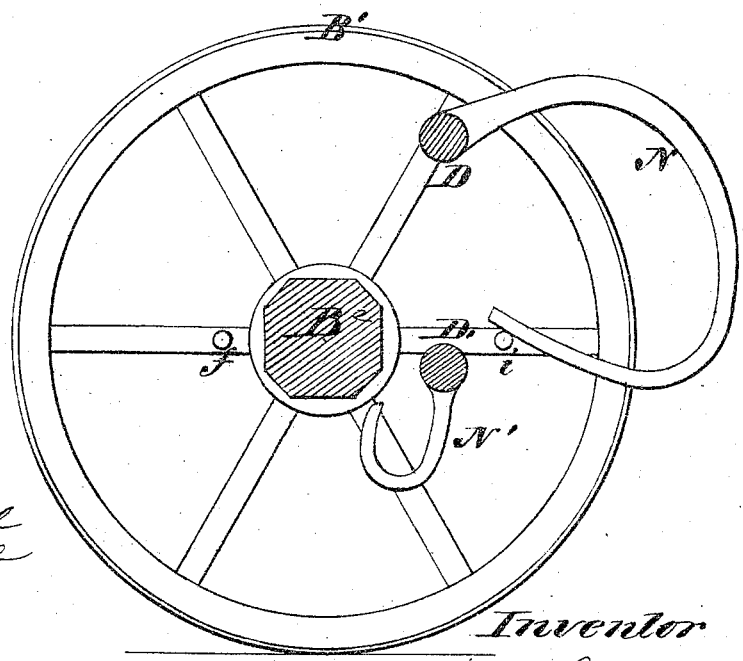
Figure 3:
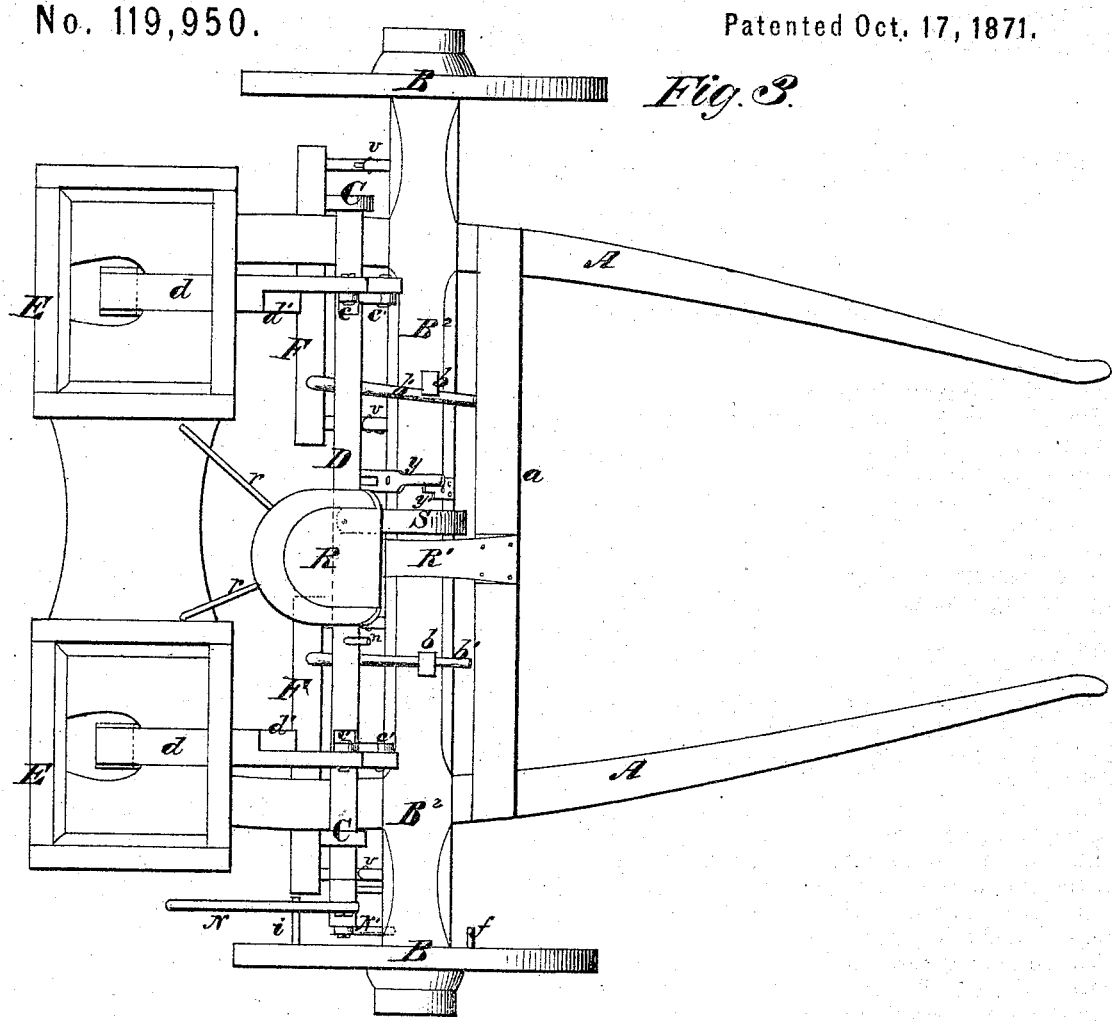
Figure 4:
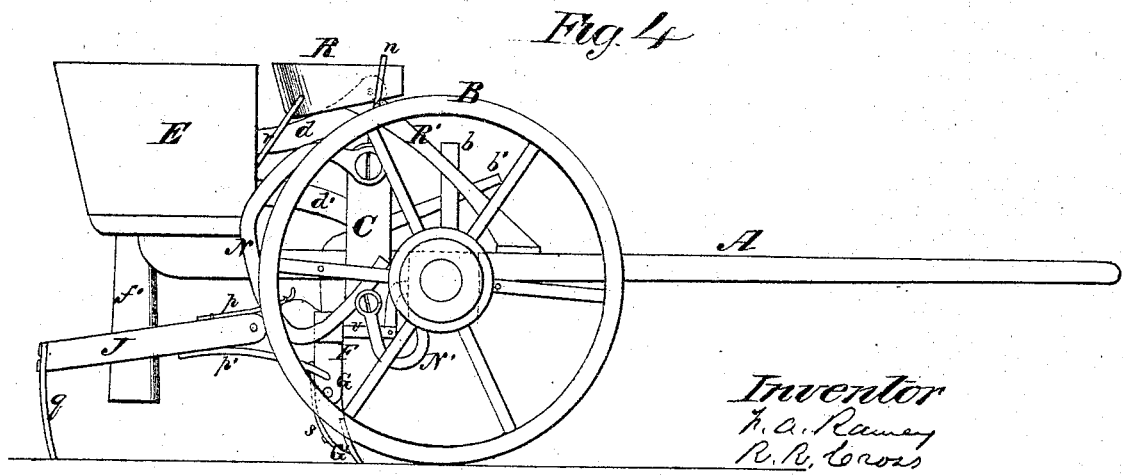

Figure 1, plate 1, is a sectional view of the planter. Fig. 2, plate 1, is a sectional view, showing the devices for operating the seed-slides. Fig. 3, plate 2, is a plan view of the planter complete. Fig. 4, plate 2, is an elevation of one end of the planter.

Similar letters of reference indicate corresponding parts in the several figures.

This invention relates to certain novel improvements on corn and cotton-planters of the kind which are mounted on wheels, and which are provided with drivers' seats.

The following description of my invention will enable others skilled in the art to understand it.

In the accompanying drawing, A A represent two thills which are secured upon an axle, $B^2$, of two transporting-wheels B B. The rear ends of said thills extend back of the axle and afford supports for the seed-hoppers E E, the base-board of which latter connects together the rear extensions of the thills. Just in front of the axle $B^2$ and secured to the thills is a bar, $a$, from which rises a standard, R', for the driver's seat R; this standard extends backward so as to support the seat somewhat in rear of the axle and thereby relieve the horse from the weight of the driver, and at the same time to afford the driver convenient access to certain levers, hereinafter explained. Each seed-hopper is perforated at $e$ and provided with a seed-discharging guide, $f'$, flaring downwardly. Above the perforation or seed-cup $e$ is a longitudinally-movable slide $d$, and below this cup $e$ is a corresponding slide, $d'$. The slides $d$ $d'$ are connected by joints, respectively, to arms $c$ $c'$, which give to them alternate reciprocating motions, so that a change of seed first falls into the cup $e$ on slide $d'$, is then covered or cut off by slide $d$, after which the charge is discharged by the movement of the slide $d'$ from beneath said cup. The arms $c$ $c$ of the upper slides $d$ $d$ are applied to a rock-shaft, D, which has its end bearings in standards C C, fastened to the outside edges of the thill extensions A A, and the lower slides $d'$ $d'$ are pivoted to arms $c'$ $c'$ on a rock-shaft, D', which has its end bearings in the lower ends of the standards C C beneath the thills A. On one extremity of the shaft D is rigidly fastened a large hooked cam, N, which, when struck by one or more studs, $i$, on the spoke of wheel B, will move slides $d$ $d$ forward and uncover the cups $e$ $e$ in the seed-hoppers. A similar hooked cam, N', but not as large as cam N, secured on one or more pins $f$ on wheel B, will move slides $d'$ $d'$ forward and allow seeds to fall from the cups $e$. The shafts D D' are provided with springs $s$ $s'$ which are secured to axle B alongside of the seat-standard R' and which return the seed-slides immediately after they are released by the studs and cams above described. The sides $d'$ $d'$ are connected to long pins on the arms $c'$ $c'$ which allow the shaft D' to be adjusted endwise by means of a lever, $y$, thus enabling the attendant to move the cam N' out of the way of the tripping-stud $f$ when it is desired to stop the discharge of seed from the hoppers. The stop $y'$ alongside of lever $y$ will hold this lever in place after said adjustment. In rear of and a little below the axle B are two horizontal beams F F, which are connected by joints to the said axle, and which have rigidly secured to them the shovel-standards G G, the lower pivoted sections G G' of which carry the shovels and are prevented from backward displacement, under ordinary circumstances, by means of springs $s$. These sections G' are attached to the standards proper by horizontal transverse pivots, and the springs $s$, which afford back bearings for the said sections, are not so stiff but that they will yield should the shovels strike an obstruction, which would be liable to break the parts. The shovels are arranged directly in front of the seed-tubes $f'$, and just above each shovel-standard a slotted drag-bar, J, is pivoted to a beam, F, which receives through it a tube, $f'$, and has secured to its rear end a forked coverer, $q$, for covering the seeds after they are deposited into the drills. The drag-bars are provided with springs $p$ and looped supports $p'$. The springs $p$ are applied at the joints of the drag-bars for allowing the covers to rise should they strike an obstruction which would be liable to break or derange the machine. To the inner end of each beam F a lever, $b'$, is secured, which curves forward over the axle $B^2$ alongside of a notched standard, $b$. By means of these levers $b'$ the drag-bars and their coverers can be raised or depressed, and by means of the notches in the standards $b$ the levers can be secured in any desired position. Not only can the drag-bars and their coverers be lifted by levers $b'$, but it will be seen that the beams F are rocked on their joints, thus allowing the shovels to be lifted also.

Having described our invention, what we claim as new is—

1. The hooked cams N N', the latter adjustable, and both constructed and arranged, as described, in combination with the slides $d\ d'$, arms $c\ c'$, rocking shafts D D', studs $i\ f$, lever $y$, stop $y'$, the bar D', and springs $s\ s'$, all substantially in the manner and for the purpose described.

2. The combination of the levers $b'\ b'$, notched standards $b$, independent beams F F, shovels G G', coverers $q$, beams J, seed-tube $f'$, and the seed-dropping mechanism, all constructed, arranged, and operating as described.

FRANCIS A. RAMEY.
RANSLER R. CROSS.

Witnesses:
JNO. C. OTT,
GEORGE DOSH.

(133)